United States Patent [19]

Imes, Jr.

[11] 4,195,910
[45] Apr. 1, 1980

[54] MULTIDIRECTIONAL VISUAL DISPLAY DEVICE

[76] Inventor: Jack Imes, Jr., 3020 W. Spencer, Appleton, Wis. 54911

[21] Appl. No.: 835,006

[22] Filed: Sep. 20, 1977

Related U.S. Application Data

[63] Continuation-in-part of Ser. No. 661,109, Feb. 25, 1976, abandoned.

[51] Int. Cl.² .............................................. G02B 27/00
[52] U.S. Cl. ..................................... 350/167; 40/430; 40/473; 40/474
[58] Field of Search .................. 350/167; 40/429, 430, 40/431, 432, 435, 470, 473, 474, 502, 433

[56] References Cited

U.S. PATENT DOCUMENTS

| | | | |
|---|---|---|---|
| 592,631 | 10/1897 | Hollander | 350/167 |
| 2,272,945 | 2/1942 | Hotchner | 40/436 |
| 3,421,805 | 1/1969 | Rowland | 350/167 X |
| 3,437,401 | 4/1969 | Siksai | 350/167 X |
| 3,686,781 | 8/1972 | Calhoun, Jr. | 350/167 X |
| 3,791,058 | 2/1974 | Mollica | 40/431 |
| 3,808,721 | 5/1974 | Gersch | 40/432 |

*Primary Examiner*—John K. Corbin
*Assistant Examiner*—John D. Lee
*Attorney, Agent, or Firm*—Vogel, Dithmar, Stotland, Stratman & Levy

[57] ABSTRACT

A device for producing multidirectional visual displays in which a refracting member having a plurality of elongated lens elements and a design member generally parallel thereto are rotated with respect to each other to provide multidirectional visual displays. The refracting member may be flat or arcuate to form spheres or cylinders so long as the design member is complementary in shape. Rotation is generally provided to the design member.

8 Claims, 10 Drawing Figures

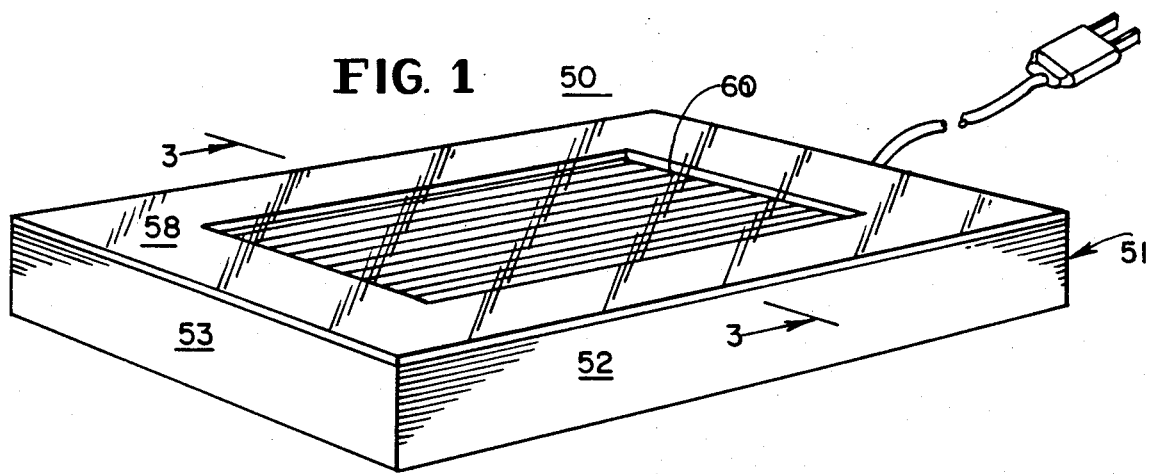
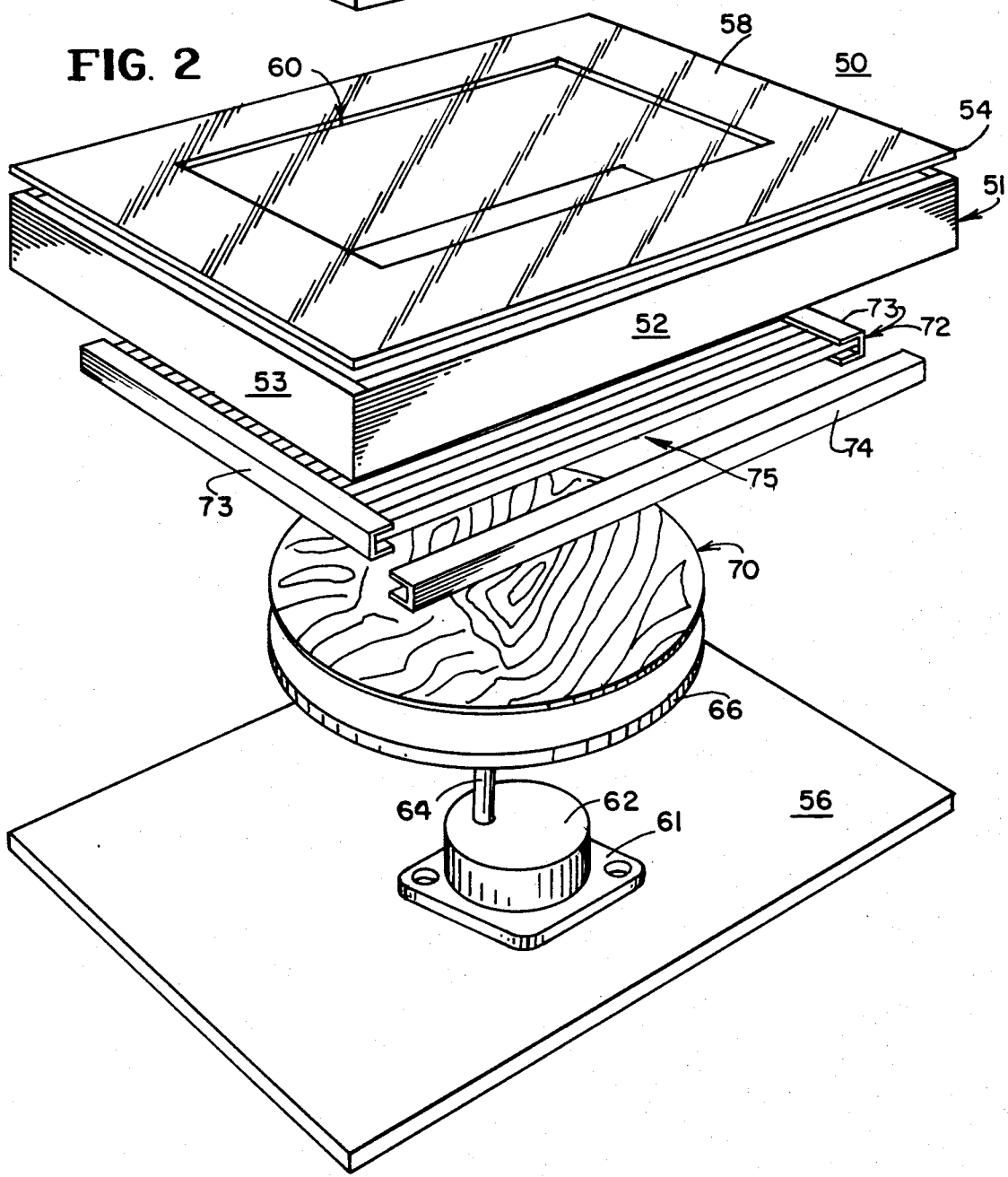

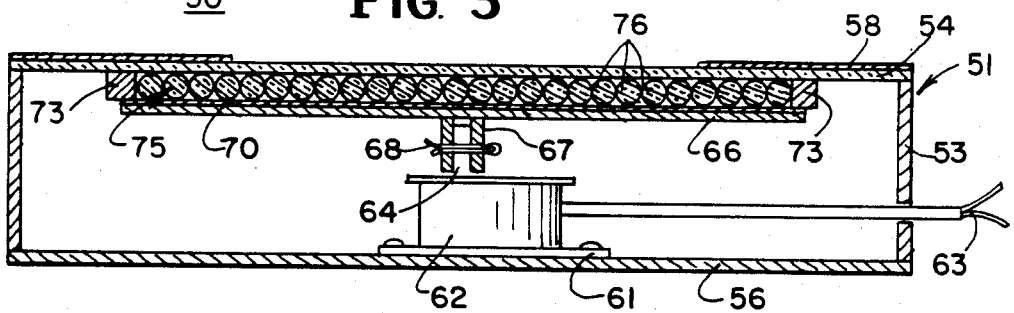
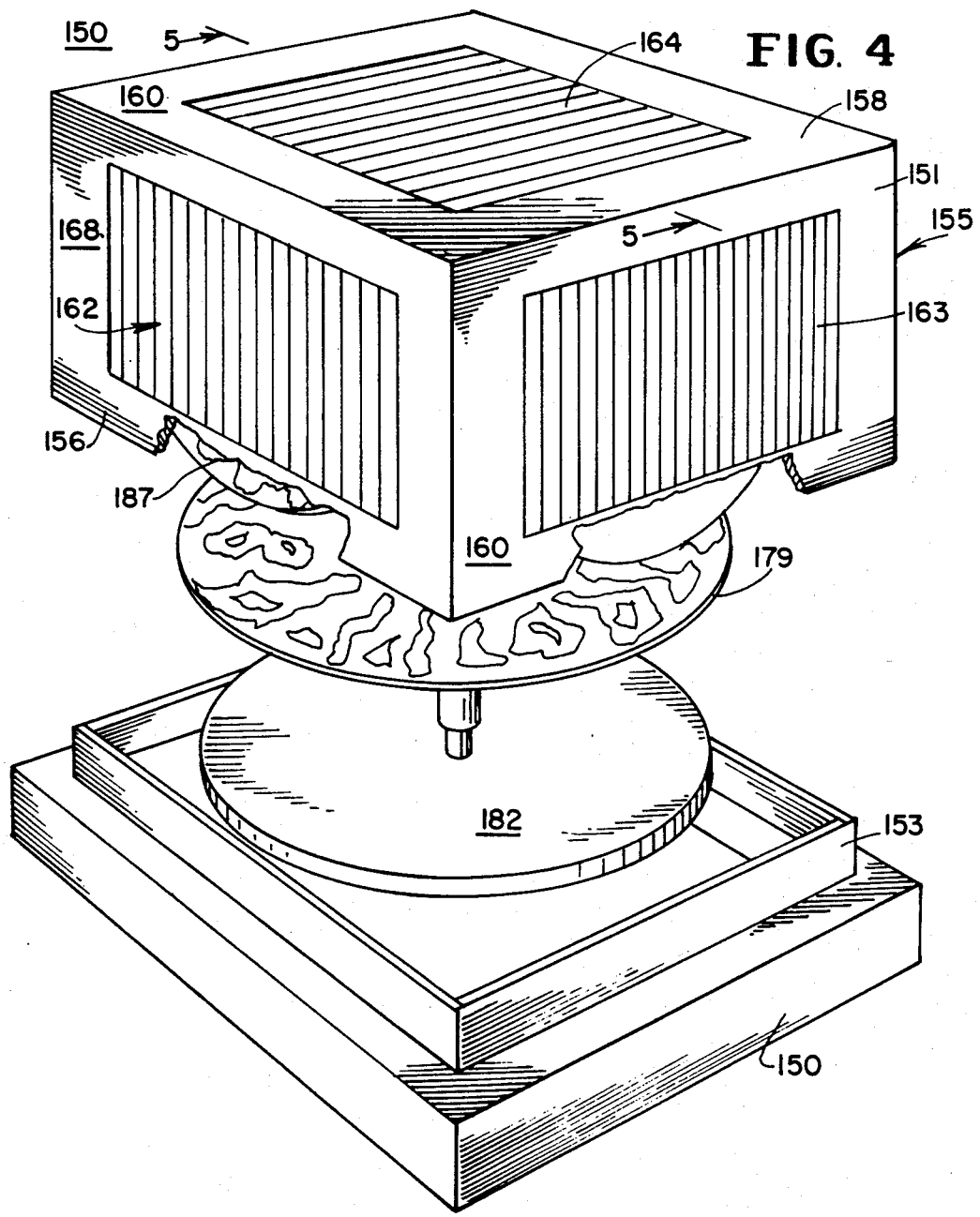

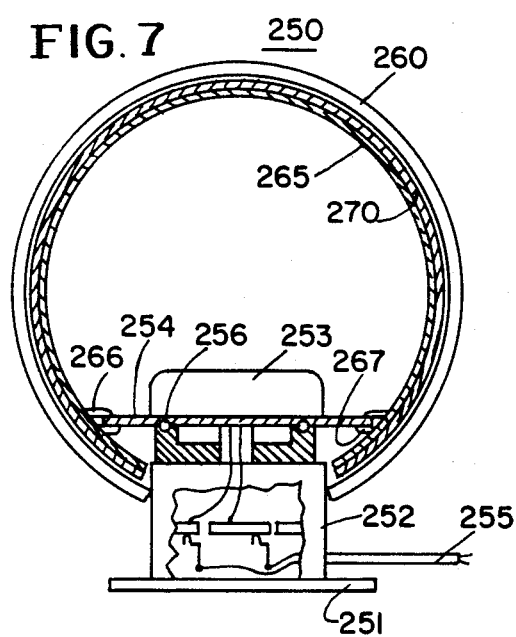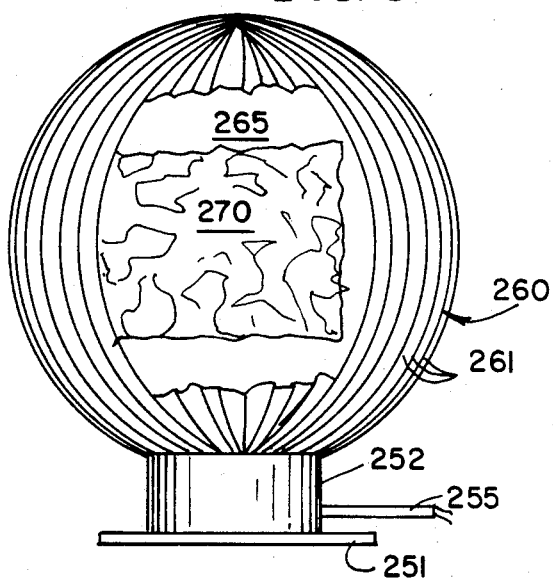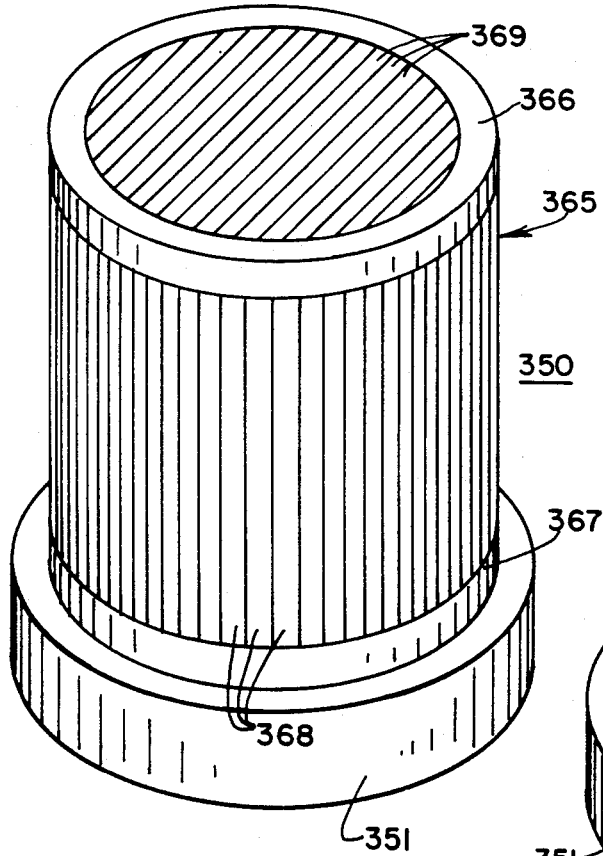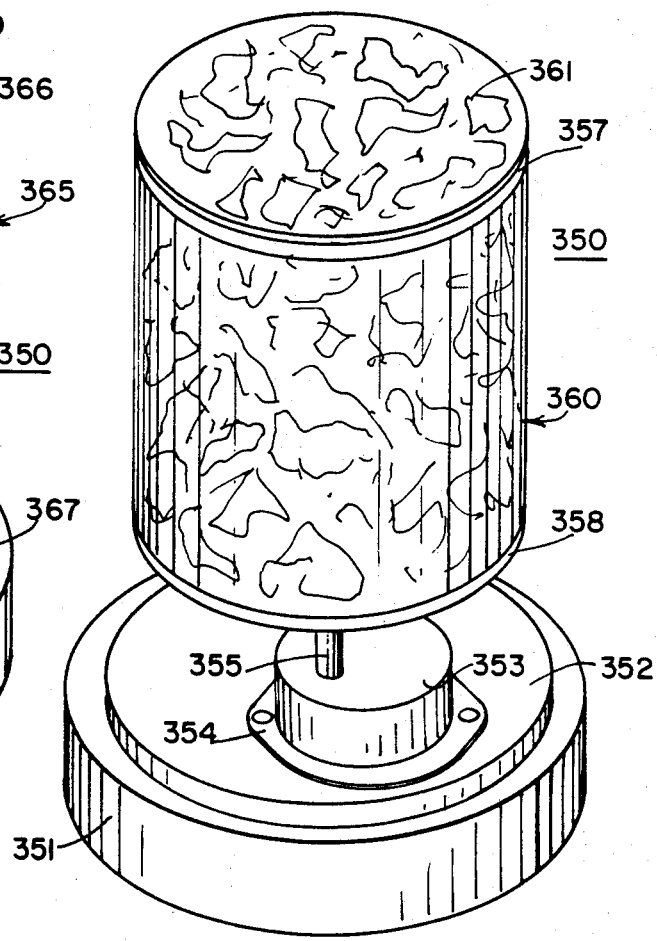

MULTIDIRECTIONAL VISUAL DISPLAY DEVICE

RELATED APPLICATIONS

This application is a continuation-in-part of my prior filed and copending patent application Ser. No. 661,109, filed Feb. 25, 1976, now abandoned.

BACKGROUND OF THE INVENTION

Multidirectional visual displays are useful, due to their eye appeal, as toys for children, advertising signs, and displays in general. Novelty items such as lamps, globes or tables may make use of visual displays as their central distinguishing feature. Visual displays have long been present in the art, but generally have been unsatisfactory due to the type of visual display produced. Representative of the prior art in the field is U.S. Pat. No. 592,631 issued to Hollander, Oct. 26, 1897, for APPARATUS FOR PRODUCING ILLUSIVE EFFECTS. In the Hollander patent, a refracting element consisting of a plurality of glass rods is positioned in the front of a frame. A web carrying the design thereon is moved linearly past the refracting member to produce a visual display in which lines move essentially in one direction only. That is, the design principally moves in the direction of movement of the web which is in one direction only.

Another representative patent is U.S. Pat. No. 2,272,945 issued to F. Hotchner, Feb. 10, 1942 for LUMINOUS DISPLAY WITH AN EFFECT OF MOTION. The Hotchner patent, shows two spaced apart rings of lenticular material which are moved relative to each other to produce a flashing effect from a light positioned behind the two lenses. The Hotchner device produces rapidly blinking light patterns but does not produce a visual display of the type set forth below. Hotchner also discloses a moving belt mechanism for producing visual displays but in that respect it is quite like Hollander.

SUMMARY OF THE INVENTION

This invention relates to a device for producing simultaneous multidirectional visual displays.

It is a general object of the present invention to provide a device for producing multidirectional visual displays in which patterns move in at least four distinct directions simultaneously.

An important object of the present invention is to provide a device for producing continuously shifting multidirectional visual displays, said device comprising a refracting member having a plurality of adjacent elongated lens elements with an obverse surface and a reverse surface, a member with a design on at least one surface thereof positioned with said one surface substantially parallel to the reverse surface of said refracting member and spaced therefrom a distance substantially equal to one lens radius, motor means for providing rotational movement between said member having the design thereon and said refracting member, and means for maintaining the parallel and spaced relationship between said design and refractory members during the relative movement therebetween, whereby continuously shifting multidirectional visual displays are produced at the obverse surfaces of said refracting member by cooperation between said refracting member and said design member during the rotational movement therebetween.

Another object of the present invention is to provide a device of the type set forth wherein the refracting member and the design member are spherical.

A further object of the present invention is to provide a device of the type set forth in which the refracting member and the design member are cylindrical.

These and other objects of the present invention may more readily be understood by reference to the following specification wherein the specific embodiments are set out by way of illustration only and are not meant to limit the invention beyond the true spirit and scope thereof.

BRIEF DESCRIPTION OF THE DRAWINGS

FIG. 1 is a perspective view of a display device of the present invention;

FIG. 2 is an exploded perspective view of the display device shown in FIG. 1, particularly illustrating the relationship of the various parts thereof;

FIG. 3 is a view in section of the display device illustrated in FIG. 1, taken along line 3—3 thereof;

FIG. 4 is an exploded perspective view of a second embodiment of the present invention;

FIG. 7 is a view in section of a third embodiment of the present invention;

FIG. 8 is a side elevational view of the third embodiment illustrated in FIG. 7;

FIG. 9 is a side elevational view of a fourth embodiment of the present invention; and FIG. 10 is an elevational view of the internal parts of the display device illustrated in FIG. 9.

DETAILED DESCRIPTION OF THE PREFERRED EMBODIMENTS

Figure 5:
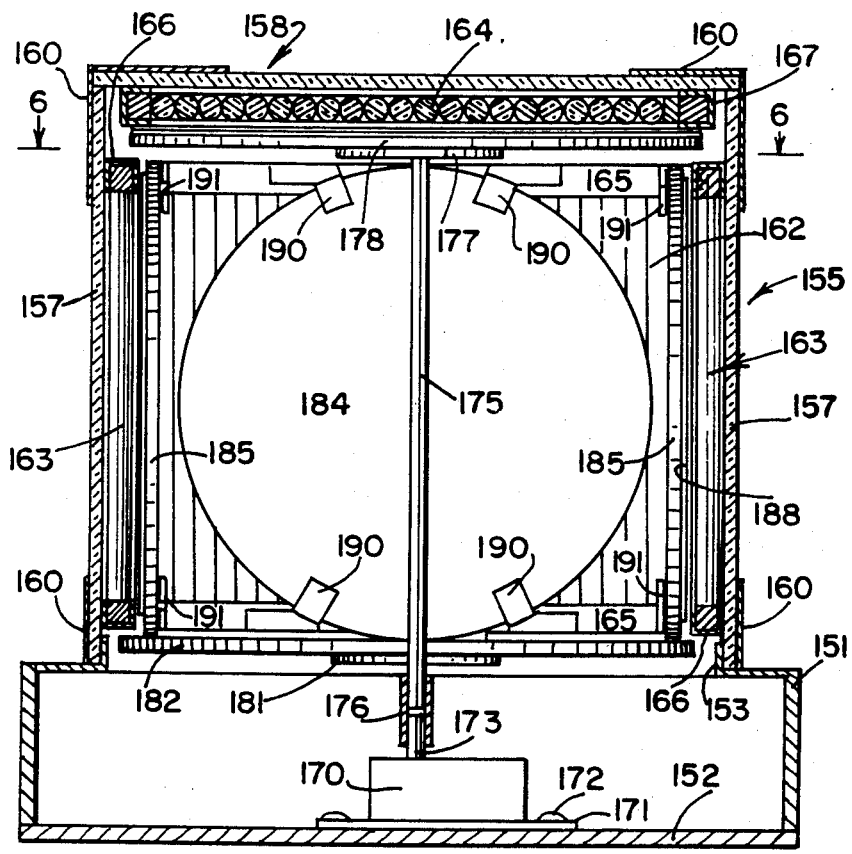
FIG. 5 is a view in section of the display device shown in FIG. 4, taken along line 5—5 thereof.

Referring now to FIGS. 1 through 3, there is disclosed a display 50 including a frame member 51 comprised of spaced apart and parallel side walls 52 interconnected by parallel and spaced apart end walls 53 to form a rectangular configuration. The frame 51 includes a front plate of glass or other transparent medium 54 and a back wall 56 which may be opaque. An opaque mask 58 overlies a portion of the front wall 54 to provide a central display area 60.

A motor mounting plate 61 is fixedly connected to the back wall 56 and supports a motor 62 thereon, the motor 62 being provided with a standard electrical leads 63 and an output shaft 64. Fixedly connected to the output shaft 64 of the motor 62, is a rotor base 66 from which depends a hollow cylinder 67 constructed and arranged to fit over the output shaft 64 of the motor. A cotter pin 68 extends through aligned apertures in the cylinder 67 and the output shaft 64, thereby fixedly to connect the rotor base 66 with the output shaft 64 of the motor 62. A pattern or design 70 is removably mounted on the rotor base 66 and is substantially coextensive therewith.

There is a support frame 72 fixedly mounted on the front wall 58 outwardly of the display area 60. The support frame 72 includes spaced apart side rails 73 and end retainers 74. A refractory member 75 fits within the support frame 72 and includes a plurality of elongated synthetic organic resin rods 76 in side by side abutting relationship. Each rod 76 of the refracting member 75 has a diameter greater than about $\frac{1}{4}''$ to enhance the visual effect. It is critical to the performance of the present invention that the design 70 on the rotor base 66 be spaced no greater than one lens radius from the rear surface of the refractory member 75 or rods 76.

In operation, actuation of the motor 62 and shaft 64 thereof causes rotation of the rotor base 66 to provide rotary motion of the design 70 with respect to the refracting member 75. Since the design 70 is moving rotationally with respect to the refracting member 75, four distinct types of motion are viewed through the display area 60 simultaneously. Assuming that the rotor 66 is moving in a clockwise direction as viewed in FIG. 2, the righthand most portion of the display area 60 will have a visual effect in which movement is from top to bottom whereas the lefthand side of the display area 60 will have a visual effect in which movement is from bottom to top. The top half of the display area will have a visual effect in which movement seems to be from left to right, whereas the bottom portion of the display area 60 will have movement which looks to be from right to left. Accordingly, it is seen that four distinct types of motion are apparent simultaneously, and that the four distinct types of motion continuously shift but remain distinct so long as the motor 62 is actuated.

The refracting member 75 may be comprised of a plurality of glass or synthetic organic resin rods as hereinbefore set forth or may be sheet material with an obverse surface comprised of adjacent hemicylinders and a reverse surface which is flat. Each hemicylinder may have the same or different diameters. A wide variety of materials and configurations are applicable for the refracting member 75.

Figure 6:
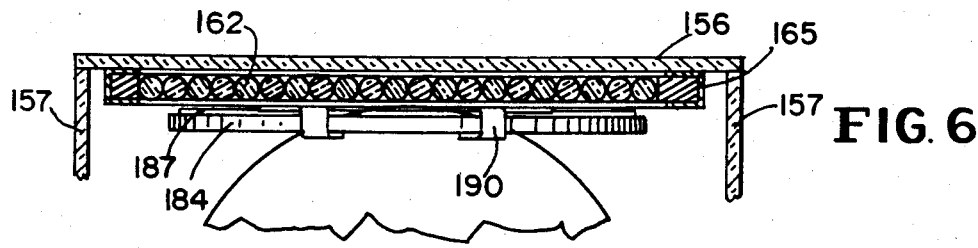
FIG. 6 is a view in section of the device illustrated in FIG. 5, taken along line 6—6 thereof.

Referring now to FIGS. 4 through 6, there is disclosed a second embodiment 150 of the present invention. The display or embodiment 150 includes a base member 151 having a bottom 152 and an upstanding flange or lip 153, the upstanding flange 153 forming a square in plan view. A cover 155 is shaped and arranged to fit over the upstanding flange 153 and frictionally engage same, the cover resting on the base 151. The cover 155 is comprised of spaced apart parallel side walls 156 and spaced apart parallel end walls 157 interconnecting the side walls. A top wall 158 interconnects each of the side and end walls. A mask 160 is provided around each of the edges of the side, end and top walls to define five display areas.

A refracting member 162 is provided in each of the side walls 156, a refracting member 163 is positioned at each of the end walls 157, and a refracting member 164 is positioned at the top wall 158. Supports in the form of rails and retainers 165 are provided for each refracting member 162 to maintain the refracting member in registry with the display area formed by the mask 160 on the side walls 162. Supports in the form of rails and end retainers 166 are provided for each of the refracting members 163 to maintain the refracting members 163 in place adjacent to and in registry with the respective end walls 157. Finally, supports in the form of end rails and retainers 167 are provided for the refracting member 164 to maintain it in place and in registry with the display area formed in the top wall 158. The refracting members 163 and 164 lie adjacent to the respective side and top walls 157 and 158, as in the first embodiment, to reduce the possibility of edge shadow effects.

A motor 170 on a motor mounting plate 171 is fixedly connected to the bottom 152 by means of appropriate bolts 172. The motor 170 has an output shaft 173 which receives thereon a sleeve 176 which serves to connect the output shaft 173 of the motor with a central shaft 175, the central shaft 175 extending upwardly from the base 151 adjacent to the refracting member 164. An upper plate 177 is fixedly mounted on the distal end of the central shaft 175 and forms a base or support for a disc 178, the disc or wheel 178 being substantially coextensive in diameter with the refracting member 164. The disc 178 supports a design member 179 either by adhesive or by friction or other suitable means, the design member 179 being easily replaceable.

Near the bottom of the central shaft 175 is a drive wheel 182 which rests on a base plate 181 fixedly secured to the shaft 175. Rotation of the shaft 175 causes the drive wheel 182 and the disc 178 to rotate about the axis of the shaft 175. Side wheels 184 and end wheels 185 are respectively provided adjacent to refracting members 162 and 163. The side wheels 184 each carry a design member 187 and the end wheels 185 each carry a design member 188. Each of the side wheels 184 and each of the end wheels 185 are in frictional contact with the upper surface of the drive wheel 182, rotation of the drive wheel 182 causing rotation of the respective end and side wheels 184 and 185.

As stated previously, the distance between the design and the associated refracting member is critical and must not exceed one lens radius; therefore, the distance between the design members 179 and the refractive members 164, between the design members 187 and refractive members 162, and between the design members 188 and the refractive members 163 must be precisely set at substantially one lens radius. The side wheels 184 are each maintained in place by tab guides 190 and the end wheels 185 are each maintained in place by tab guides 191. As seen, activation of the motor 170 results in rotation of the output shaft 173 and the central shaft 175 connected thereto. Rotation of the shaft 175 causes the design member 179 on the plate or disc 178 to rotate with respect to the refracting member 164. Simultaneously, rotation of the drive wheel 182 by the activation of the motor 170, causes the side wheels 184 and the end wheels 185 to rotate resulting in rotation of the respective design members 187 and 188 with respect to the adjacent and corresponding refracting members 162 and 163. Visual displays are thereby produced at each of the refracting members 162, 163 and 164. Since the design members are rotating with respect to the associated refracting members each of the five displays provide four distinct simultaneous visual movements as previously described with respect to the visual display for the device 50.

Referring now to FIGS. 7 and 8, there is disclosed another embodiment 250 of the display device of the present invention. The display device 250 includes a base 251 on which rests a motor housing 252 and a motor 253. Electrical leads 255 are connected to the motor 253 and to a source of electrical power (not shown). The motor 253 is provided with an output rotor or wheel 254 which rests on appropriate bearings 256.

A refracting member 260 is comprised of a plurality of individual rods 261 constructed and arranged to form a sphere which rests on the housing 252. A spherical base member 256 has circular support flanges 266 and 267 connected thereto near the base thereof, which flanges frictionally engage the drive wheel 254 of the motor 253. The flanges 266 and 267 may be constructed of any material which will frictionally engage the drive wheel 254 while at the same time provide sufficient support for the base member 265. A design member 270 fits over the base member 265 and is, therefore, complementary in shape to the refracting member 260. To facilitate changing, the design member 270 may be constructed in two pieces and retained in place on the base member 265 by known means such as one sided adhesive tape or the like. The distance between the design member 270 and the rear of rods 261, must be uniformly maintained at substantially one lens radius.

Activation of the motor 253 causes the drive wheel 254 to rotate in a horizontal plane thereby causing the base member 265 and the design member 270 supported thereon to rotate with respect to the spherical refracting member 260. Multidirectional visual displays are produced by the relative rotational movement between the design member 270 and the refracting member 260.

Referring now to FIGS. 9 and 10, there is disclosed another embodiment 350 of the display device. The display device 350 includes a base 351 having a housing plate 352 on the upper surface thereof. A motor 353 has a motor mounting plate 354 fixedly connected to the housing 352 and an upper shaft 355 extending vertically upwardly in use from the motor 353. Fixedly connected to the output shaft 355 of the motor 353 is an upper wheel or plate 357 and a lower wheel or plate 358. A cylindrical design member 360 is positioned between the upper and lower wheels 357 and 358 respectively while a design disc member 361 is removably mounted on the upper wheel 357 and constructed and arranged to rotate therewith. Both the members 360 and 361 are constructed and arranged to be easily changed to permit the use of different designs.

A refracting member 365 generally cylindrical in shape is constructed and arranged to fit over the housing 352 and to be frictionally engaged thereby, the refracting member resting on the base 351. Specifically, the refracting member includes an upper circular rim 366 and a lower circular rim 367 with a plurality of rods 368 extending therebetween and forming a cylinder. The rods 368 may be glass or synthetic organic resin and abut each other. A plurality of rods 369 form in use, a horizontal plane, and extend across the opening formed by the upper rim 366. Accordingly, there is provided a refracting member 365 which includes a plurality of vertically extending rods 368 and a plurality of horizontally positioned rods 369, the rods 368 forming a cylinder and the rods 369 forming a plate.

The distances respectively between the design members 360 and 361 and the associated refractive rods 368 and 369 must be uniformly maintained at substantially one lens radius. Activation of the motor 353 by connection to an electrical source results in rotation of the shaft 355 and hence the design members 360 and 361 connected thereto. Multidirectional visual displays are produced at the refracting member 365 by the relative rotation of the design members 360 and 361 with respect to the refracting member 365.

In the foregoing examples, there has been illustrated display devices in which the rotational movement is provided to the design member while the refracting member remains stationary. However, in several of the embodiments such as those illustrated in FIGS. 7 through 10, the relative rotation between the design member and the refracting member may be provided by rotating the refracting member and maintaining the design member stationary or rotating the refracting member in one direction and rotating the design member in another direction. The appended claims are intended to cover such alterations and modifications that fall within the true spirit and scope of the present invention and are not meant to be restricted to the specific embodiments disclosed herein.

What is claimed is:

1. A device for producing continuously shifting multidirectional visual displays, said device comprising a refracting member having a plurality of adjacent elongated lens elements with an obverse surface and a reverse surface, a disk-shaped member with a design on at least one surface thereof positioned with said one surface substantially parallel to the reverse surface of said refracting member and spaced therefrom a distance substantially equal to one lens radius, motor means for providing rotational movement between said disk member having the design thereon and said refracting member, and means for maintaining the parallel and spaced relationship between said design and refractory members during the relative movement therebetween, whereby continuously shifting multidirectional visual displays are produced in which movement is in four directions simultaneously at the obverse surfaces of said refracting member by cooperation between said refracting member and said design member during the rotational movement therebetween.

2. The device set forth in claim 1, wherein said refracting elements are elongated synthetic organic rods.

3. The device set forth in claim 1, wherein said refracting elements are sheets of synthetic organic resin having a flat reverse surface and an obverse surface comprised of elongated rod like configurations.

4. The device set forth in claim 1, wherein said member having the design thereon includes a base member connected to said motor means and constructed and arranged to accept replacement design to facilitate easy removal of the design and replacement of same.

5. The device set forth in claim 1, wherein said design member rotates about a fixed axis.

6. The device set forth in claim 1, wherein said refracting member comprises a plurality of discontinuous refracting surfaces each provided with a design member positioned parallel to and facing the rear surface of the corresponding refracting member, whereby to provide a plurality of separate visual displays with each refracting member providing with its corresponding design member multidirectional visual displays.

7. The device set forth in claim 1, wherein said motor means rotates said design member.

8. A device for producing continuously shifting multidirectional visual displays, said device comprising a spherical refracting member having a plurality of adjacent elongated lens elements with an obverse surface and a reverse surface, a generally spherical member with a design on at least a portion of at least one surface thereof being positioned with said one surface generally parallel to the reverse surface from said spherical refracting member and spaced therefrom a distance substantially equal to one lens radius, motor means for providing rotational movement between said member having the design thereof and said refracting member, and means for maintaining the parallel and spaced relationship between said design and refractory members during the relative movement therebetween, whereby continuously shifting multidirectional visual displays are produced at the obverse surface of said refracting member by cooperation between said spherical refracting member and said spherical design member during the rotational movement therebetween.

* * * * *